W. FORTHMANN.
VEHICLE COUPLING.
APPLICATION FILED MAR. 28, 1911.
1,073,339.
Patented Sept. 16, 1913.
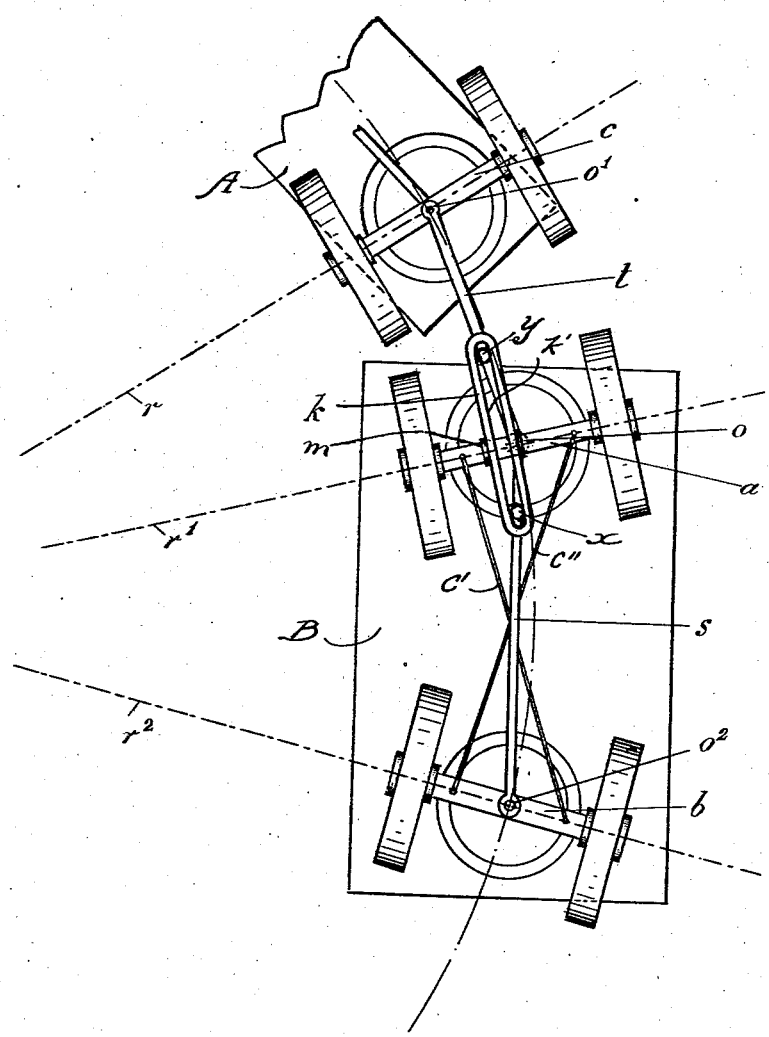
Witnesses:
Inventor,
Walter Forthmann,
By B. Singer
Attorney.

UNITED STATES PATENT OFFICE.

WALTER FORTHMANN, OF POTSDAM, GERMANY.

VEHICLE-COUPLING.

1,073,339.  Specification of Letters Patent.  Patented Sept. 16, 1913.

Application filed March 28, 1911. Serial No. 617,461.

*To all whom it may concern:*

Be it known that I, WALTER FORTHMANN, residing at 15 Waldermarstrasse, Potsdam, Prussia, Germany, have invented certain new and useful Improvements in and Connected with Vehicle-Couplers, of which the following is a specification.

My present invention relates to improvements in and connected with vehicle couplers, and is particularly adapted for use on vehicles which form a trackless train.

The principal object of my invention is to so couple a leading and following vehicle that the axes of oscillation of the axles thereof are all equidistant from a common center, when the vehicles are drawn in a curved path of movement, with the longitudinal axes of each axle radiating from said common center.

Other objects of my invention are to dispose and proportion certain of the elements forming a part of my invention that they may be constructed in a simple and efficient manner, to suit the particular circumstances at hand, that is, to provide means which with a certain ratio of elements disposed in coacting relation, according to my invention, any person skilled in the art may adapt the invention to vehicles of different sizes, and provide the proper clearance between vehicles in order to successfully round curves.

In the drawing, forming a part of this specification, the invention is shown by way of example, as applied to a leading vehicle A and a following vehicle B, the vehicles being drawn in a curved path of movement. The vehicle A is provided with a wheeled axle $c$ pivoted as at $o'$, so that the axis $r$ of the axle may assume any desirable angle to the longitudinal axis of the vehicle body. Likewise, vehicle B is provided with wheeled axles $a$ and $b$ pivoted as at $o$ and $o^2$, respectively. In order that the axes $r'$ and $r^2$ of axles $a$ and $b$, respectively, will, at all times assume the same angular position with respect to the longitudinal axis of the vehicle, I connect the said axles $a$ and $b$ with rods $c'$ and $c''$, or any other antiparallel mechanism. The centers of oscillation $o$ and $o^2$ are connected by draw bar $s$, which, of course, is of predetermined length dependent upon the spacing of the axles $a$ and $b$. The centers of oscillation $o'$ and $o$ are connected by draw bar $t$ which is of such a length so as to permit the leading vehicle A and following vehicle B to travel in an arc shaped path of a practical radius, without engaging each other. Having determined the length of draw bar $t$, from center $o'$ to $o$, I position on draw bar $s$ a guide element or pin $x$ at any convenient distance from center $o$. Having determined the length of draw bar $s$ from center $o^2$ to $o$ I position a guide element or pin $y$ on draw bar $t$, at a distance determined by the simple proportion $o'—o:o—x::o^2—o:o—y$, that is, the length of the draw bar between $o'$ and $o$ is proporationate to $o—x$ and $o^2—o$ is proportionate to $o—y$. Upon axle $a$ I mount a bar $k$ slotted as at $k'$, to receive the said guide elements or pins $x$ and $y$, this bar being disposed with its slot $k'$ at right angles to the axle $a$ in substantially a horizontal plane, and movable longitudinally of axle $a$, preferably through a bearing $m$ embracing said axle.

The operation of the device is as follows: When the cars are drawn in a circular path of movement, the draw bar $t$, through pin $y$, causes the bar to move with respect to the axle $a$ longitudinally of the latter. This movement is restricted to a certain extent by the pin $x$ on draw bar $s$ so that the centers $o'$, $o$ and $o^2$ are all intersected by an arc drawn from the point of intersection of axis $r$, $r'$ and $r^2$ of axles $c$, $a$ and $b$, respectively. For any practical path of movement described as an arc, this intersection of the axle centers takes place when the pins $y$ and $x$ are positioned in proportion to draw bar $s$ and $t$, respectively, as described.

I claim:—

In vehicle couplers of the character described the combination with a leading and a following vehicle, of a slotted link secured to a bearing on the front axle of the following vehicle at substantially a right angle thereto, bars $t$, $s$ connecting the rear axle of the leading vehicle with the front axle of the following vehicle and both axles of the following vehicle respectively, pins $x$, $y$ upon said bars at predetermined points thereof entering the slot of said link for positively guiding the axles of a train of cars in a circular path over the road.

In testimony whereof I affix my signature in presence of two witnesses.

WALTER FORTHMANN.

Witnesses:
 HENRY HASPER,
 WOLDEMAR HAUPT.